United States Patent [19]

Evans

[11] Patent Number: 4,558,220

[45] Date of Patent: Dec. 10, 1985

[54] RADIOACTIVITY WELL LOGGING

[75] Inventor: Hilton B. Evans, Englewood, Colo.

[73] Assignee: Gearhart Industries, Inc., Fort Worth, Tex.

[21] Appl. No.: 307,925

[22] Filed: Oct. 2, 1981

[51] Int. Cl.$^4$ ............................................. G01V 5/12
[52] U.S. Cl. ................................... 250/269; 250/266; 250/494.1; 378/88
[58] Field of Search ...................... 250/269, 494.1, 255, 250/253, 266, 256, 262, 308, 394, 358.1, 265; 378/53, 88, 86, 197, 124, 45–48, 3, 157

[56] References Cited

U.S. PATENT DOCUMENTS

| | | | |
|---|---|---|---|
| 2,613,325 | 10/1952 | Herzog . | |
| 2,926,259 | 2/1960 | Dewan | 250/255 |
| 3,202,822 | 8/1965 | Kehler . | |
| 3,511,989 | 5/1970 | Yakubovich et al. | 250/308 |
| 3,843,881 | 10/1974 | Barton, Jr. et al. | 250/269 |
| 3,846,631 | 11/1974 | Kehler | 250/262 |
| 3,925,660 | 12/1975 | Albert | 378/124 |
| 3,965,358 | 6/1976 | Macovski | 378/5 |
| 4,090,074 | 5/1978 | Watt et al. | 378/88 |
| 4,200,792 | 4/1980 | Fanger et al. | 378/53 |
| 4,297,575 | 10/1981 | Smith, Jr. et al. | 250/266 |
| 4,362,935 | 12/1982 | Clark, III | 378/48 |

OTHER PUBLICATIONS

Sowerby et al., "Borehole Analysis for Copper and Nickel Using Gamma-Ray Resonance Scattering", Nucl. Instru. & Methods, 115 (2), Mar. 1, 1974, pp. 511–523.

Fookes et al., "Determination of Iron in High-Grade Iron Ore and of Lead in Lead Concentrate by Compton Scattering of 60-KeV γ-Rays from Americium-241", Anal. Chem., 47 (3), Mar. 1975, pp. 589–591.

Tittman et al., "The Physical Foundations of Formation Density Logging (Gamma–Gamma)", Geophysics, Apr. 1965, pp. 284–294.

Abouelwafa et al., The Measurement of Component Ratios in Multiphase Systems Using γ-Ray Attenuation", J. Phys. E: Sci. Instrum. 13, Mar. 1980, pp. 341–345.

Evans, "Three Phase Borehole Fluid Identification System", The Log Analyst, Mar.–Apr. 1979, p. 41.

"Webster's Third New International Dictionary of the English Language, Unabridged", Merriam Co., Springfield, Mass., 1961, p. 2109.

Primary Examiner—Alfred E. Smith
Assistant Examiner—Carolyn E. Fields
Attorney, Agent, or Firm—Richards, Harris, Medlock & Andrews

[57] ABSTRACT

Method and apparatus for radiological investigation of subterranean multicomponent media such as borehole fluids, and subterranean earth formations. The formation under investigation or other medium is irradiated with penetrating radiation having a plurality of discrete energy levels. The radiation at the several energy levels may be applied simultaneously or sequentially. In either case, the absorption of the applied radiation within the medium under investigation varies from one energy level to another. Radiation emanating from the medium is detected for each of the discrete energy levels and the intensity of the detected radiation for each energy level is correlated with the intensity of the applied radiation for each of the energy levels.

26 Claims, 6 Drawing Figures

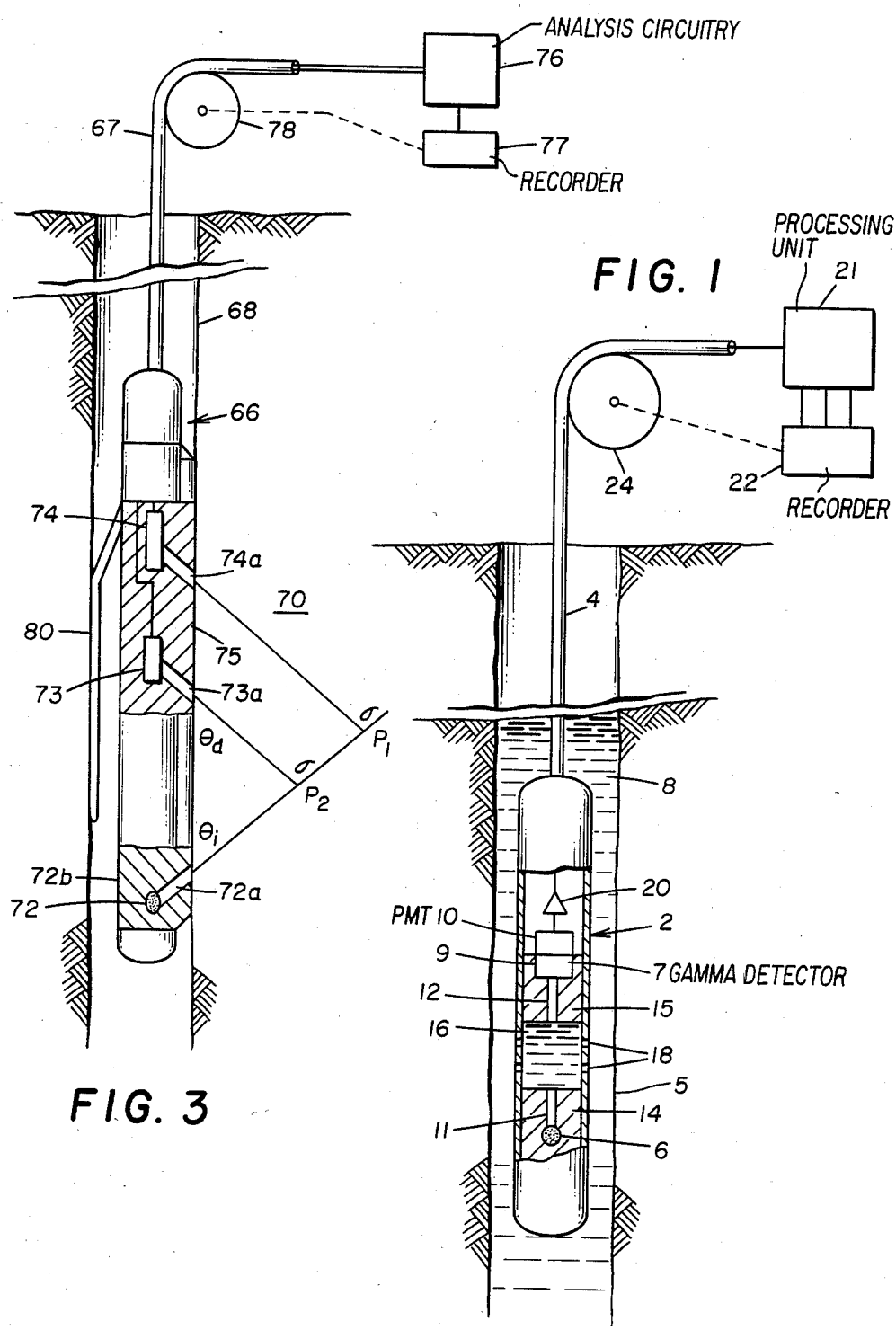

RADIOACTIVITY WELL LOGGING

BACKGROUND OF THE INVENTION

This invention relates to radioactivity well logging and more particularly to methods and systems useful in well logging employing penetrating radiation at a plurality of discrete energy levels.

In the petroleum industry, certain well logging practices involve subjecting a subterranean medium composed of several substances to radiation and measuring one or more effects of such radiation to determine the identity of substances in the system or the relative proportions of such substances. For example, in the investigation of subterranean earth formations, various radioactivity logging techniques may be employed in order to characterize such formations with regard to their fluid or mineral content, matrix lithology, density, porosity, or to provide for stratigraphic correlation. In these techniques, the formation under investigation is irradiated with a steady state or pulsed primary radiation source and the resulting radioactive effect is measured in order to characterize the formation with respect to one or more of the parameters noted above. For example, the formation may be irradiated with repetitive bursts of fast neutrons, normally neutrons exhibiting an energy greater than one Mev. When the fast neutrons enter the formation, they are moderated to lower energy levels by the nuclear collision processes of elastic and inelastic scattering. As the neutrons are moderated or slowed down, they reach the epithermal range and thence are further moderated until they reach the thermal neutron range. Once a neutron reaches the thermal energy level, it diffuses through the formation until it is captured by a nucleus with the resultant emission of one or more gamma rays. The populations of neutrons at the various energy levels decay with time following the primary irradiation and thus offer means of characterizing the formation. For example, the rate of decay of epithermal neutrons may be used to give a quantitative measure of hydrogenous material present in the formation which in turn may be indicative of the formation porosity. The rate of decay of thermal neutrons within the formation may be used to characterize the formation as to its chlorine, and thus salt water content. The thermal neutron decay rate can be determined by successive measurements of thermal neutrons or of capture gamma rays.

Various radioactivity logging processes are also carried out employing steady state radiation source. For example, in neutron porosity logging, a steady state neutron source is employed to irradiate the formation under investigation with fast neutrons. The porosity of the formation may then be determined by measuring thermal neutrons with two detectors at different spacings from the source or by measuring epithermal neutrons with a single detector.

Another widely used radioactive logging technique is the gamma ray density procedure. In this procedure, the absorption of gamma rays within the formation is used as an indication of the density and hence the porosity of the formation. In gamma ray density logging, the formation under investigation is irradiated with gamma rays which are subject to attenuation by one or more of several mechanisms. A portion of the gamma rays is scattered from the formation back into the bore hole where they are detected. The intensity of the gamma rays detected is a function of the electron density of the formation which provides a close approximation of the actual bulk density. As disclosed in U.S. Pat. No. 3,202,822 to Kehler, two detectors spaced from a gamma ray source by unequal distances may be employed in order to minimize bore hole effects such as may be due to the bore hole fluid, irregularities in the wall of the well, or mud cake, casing, cement, etc. in the well. In addition to employing a pair of detectors, Kehler also discloses the use of a collimated source and collimated detectors in order to reduce variables associated with the geometry of the detected radiation and the different energies of Compton scattered photons from different scattering angles.

SUMMARY OF THE INVENTION

In accordance with the present invention there are provided new and improved well logging processes and systems for characterizing downhole media having a plurality of components of radiation attenuation coefficients which vary as a function of the energy of applied penetrating radiation. In carrying out the invention the subterranean medium under investigation is irradiated with penetrating radiation having a plurality of discrete energy levels whereby the absorption of the applied radiation within the medium is different at each of the energy levels. The radiation emanating from the medium is selectively detected for each of the discrete energy levels and the intensity of the detected radiation measured for each energy level. The intensity of the detected radiation is then correlated with the applied radiation intensity at each of the discrete energy levels in order to determine the fractional portions of the several components of the system. A preferred application of the invention is with respect to a medium having at least three components and wherein the medium is irradiated with penetrating radiation having at least three discrete energy levels.

In a further embodiment of the invention, there is provided a well logging system which may be of the type useful in characterizing fluids within a well or formations penetrated by a well. The well logging system comprises a logging tool having suitable source means for emitting gamma rays at a plurality of discrete energy levels. Detector means are also provided in the tool for detecting gamma rays and producing output signals representative of the energy levels of detected gamma rays. The system further comprises means responsive to the output signals for selectively measuring the intensity of detected gamma rays associated with each of the discrete energy levels. Preferably the gamma ray source takes the form of a unitary gamma-ray source capable of emitting gamma rays at at least three discrete energy levels. Where the logging tool is of the type used for formation investigation, it is preferred to employ two detector sections in the tool spaced from the source by unequal distances. Each of the detector sections is associated with appropriate output signal responsive means for selectively measuring the intensity of detected gamma rays associated with the several discrete energy levels.

BRIEF DESCRIPTION OF THE DRAWINGS

FIG. 1 is a schematic illustration of a borehole fluid monitoring system embodying the present invention.

FIG. 3 is a schematic illustration of a density logging system in accordance with another embodiment of the invention.

DESCRIPTION OF SPECIFIC EMBODIMENTS

Figure 4:
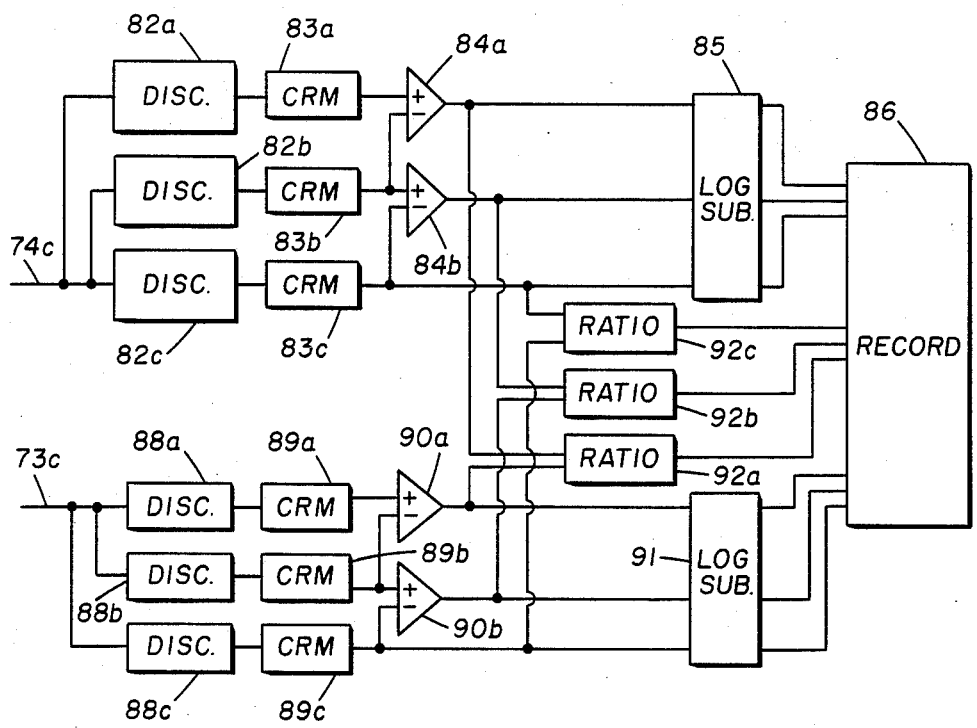
FIG. 4 is a block schematic of circuitry which may be employed in the system of FIG. 3.

Various forms of penetrative radiation may be employed in the analysis of substances by radiation absorption. For example, U.S. Pat. No. 2,613,325 to Herzog discloses a process in which a beam of penetrating radiation such as gamma rays is passed through a mixture of two known substances of unknown proportions. A measurement is made of the radiation after it has traversed the mixture. The intensity of this measured radiation is then compared with calibration measurements made by passing the radiation beam through each of the substances separately or through a mixture thereof of known proportions in order to determine the fractions of the two substances in the mixture. In addition to gamma rays, other penetrative radiation which may be employed in the reference procedure includes neutrons, X-rays, alpha rays, electrons and protons. Thus Herzog discloses the use of radiation sources ranging from relatively low energy electron beams up to highly penetrative particle radiation such as neutrons. Neutron radiation is, of course, the predominant radiation particle employed in radioactive well logging as well as in other radioactive nondestructive testing techniques. While a neutron absorption is a detectable parameter, its use is subject to a great number of variables because of the moderation (slowing down) of fast neutrons in a medium; the different effects of various chemical substances upon neutron capture; and the secondary radiation effects, e.g. activation gamma rays and capture gamma rays, associated with neutron bombardment. Thus it usually will be preferred to employ electromagnetic radiation, as contrasted with particle radiation, in carrying out the present invention. The preferred primary radiation source used in carrying out the invention will take the form of gamma rays which are highly penetrating and the invention initially will be described with reference to the use of gamma rays.

When a beam of gamma rays passes through an absorbing medium, the intensity of the gamma ray beam decays in accordance with the following exponential equation:

$$I = I_o e^{-\mu \rho l} \tag{1}$$

wherein:
$I_o$ is the intensity of the gamma ray beam at an incident point in the medium.
$I$ is the intensity of the gamma ray beam at a second point in the medium.
$\rho$ is the density of the medium
$l$ is the distance between the incident point and second point
$\mu$ is the mass attenuation coefficient of the medium for the radiation involved, and
$e$ is the Napierian base The decrease in intensity or attenuation of the gamma ray beam as it passes through the medium is due primarily to three well known mechanisms: photoelectric absorption, Compton scattering, and electron pair production. The contribution of photoelectric absorption is greatest for low energy gamma rays and decreases rapidly as the gamma ray energy increases. The pair production interaction on the other hand is negligible at low energy levels, but becomes quite significant at high energy levels of several MEV up to 10 Mev or more. Absorption due to Compton scattering by electrons is significant over a wide energy range encompassing both photoelectron production and electron pair production. It is the predominant absorption mechanism at an intermediate energy range between the low and high energy regions dominated by photoelectric absorption and pair production, respectively. For example, for the rock matrix of a typical subterranean earth formation, the Compton scattering mechanism is by far the predominant mechanism involved in absorption of gamma ray photons at energies ranging from about 0.1–0.2 Mev up to several Mev.

Returning now to equation (1), it can be seen that when the values of $I$, $I_o$, $\rho$ and $l$ are known, the equation can be solved for the value of $\mu$ as follows:

$$\mu = \frac{1}{\rho l} \ln \frac{I_o}{I} \tag{2}$$

For the medium having a plurality of components, the bulk attenuation coefficient $\mu_b$ of the medium for a plurality of energy levels may be expressed by the following relationship:

$$\mu_b = \sum_{i=1}^{m} \cdot \sum_{j=1}^{k} \mu_{ji} \chi_i = \mu_{11}\chi_1 + \ldots + \mu_{km}\chi_m \tag{3}$$

wherein:
k is the number of energy levels
m is the number of components in the system
$\mu_{ji}$ represents the mass attenuation coefficients of the several components in the medium at the several energy levels and
$\chi_i$ represents the fractional amount of the several components in the medium.

Similarly the bulk density $\rho_b$ of the medium is given by the following relationship:

$$\rho_b = \sum_{i=1}^{m} \rho_i \chi_i = \rho_1 \chi_1 + \ldots + \rho_m \chi_m \tag{4}$$

wherein:
$\rho_i$ represents the densities of the several components of the system,
m and $\chi_i$ are as defined above with respect to equation 3.

For a given material the mass attenuation coefficient $\mu$ in equation (1) above varies with the frequency of the applied radiation. Thus, considering, for example, two or more monochromatic gamma ray beams at different energy levels within a gamma ray spectrum, and assuming a neglible effect from electron pair production, the lower energy monochormatic beam will have a numerically larger attenuation coefficient than the higher energy gamma ray beam. Stated otherwise, the rate of absorption for the lower energy gamma ray beam is greater than for the higher energy gamma ray beam.

In the present invention these relationships are utilized to advantage to determine the relative fractions of a plurality of components in a downhole medium such as in a subterranean formation traversed by a well or borehole fluids within a well. The medium in question may be a homogeneous or heterogeneous mixture of two or more gases, liquids, or solids. While the invention may be utilized to characterize two component systems, it is particularly advantageous in the analysis of media having three or more components of unknown concentrations which are not subject to analysis through radiation density absorption and calibration techniques.

The invention may be illustrated by reference to its use in characterizing a medium consisting of three components identified herein as fluid x, fluid y, and fluid z. The average density, $\rho_1$, of the fluid mixture may be characterized by the following equation:

$$\rho_1 = \rho_x S_x + \rho_y S_y + \rho_z S_z \tag{5}$$

$\rho$ indicates the densities of each of the fluids x, y, and z and

S indicates the fractional amount of each of the fluids x, y and z.

The sum of the concentrations of the fluids expressed as fractions equals unity as follows:

$$S_x + S_y + S_z = 1 \tag{6}$$

The mixture under investigation is irradiated by three gamma ray beams having different energy levels $E_1$, $E_2$, $E_3$. The gamma ray beam emanating from the material is detected to determine the gamma ray intensity after absorption, I. Thus for the first energy level $E_1$ and referring back to equations 2 and 3, the exponential decay equation can be written as follows:

$$\frac{1}{\rho_1 l} \text{Ln}\left(\frac{I_{01}}{I_1}\right) = \mu_{x1} S_x + \mu_{y1} S_y + \mu_{z1} S_z \tag{7}$$

For the source two of a different energy level, $E_2$, the decay equation is as follows:

$$\frac{1}{\rho_1 l} \text{Ln}\left(\frac{I_{02}}{I_2}\right) = \mu_{x2} S_x \mu_{y2} S_y + \mu_{z2} S_z \tag{8}$$

And similarly for source three of an energy level, $E_3$, the decay equation is:

$$\frac{1}{\rho_1 l} \text{Ln}\left(\frac{I_{03}}{I_3}\right) = \mu_{x3} S_x + \mu_{y3} S_y + \mu_{z3} S_y \tag{9}$$

In each of equations 7, 8 and 9, $\mu$ and S are, respectively, the attenuation coefficients and fractional amounts of the component fluid and the subscripts x, y, and z identify the fluids. $I_o$ is the intensity of the incident radiation and I the intensity of the detected radiation. l is the distance between the radiation source and the detector and $\rho_1$ the bulk density of the medium. In equations 5, 7, 8 and 9, the values of $\rho$ and of $\mu$ at the different energy levels for the component fluids involved are known. The value of l for each of the source-detection systems is known or, if the same in each case, can be discounted and the value $I_o$ is known or can be measured by a suitable monitoring system. The radiation intensities $I_1$, $I_2$, and $I_3$ are measured parameters. Thus, by correlating these with each of the incident radiation intensities to arrive at the logarithm of the ratio $I_o/I$, the equations 7, 8 and 9 can be solved by reference to equation 5 for each component fraction, $S_x$, $S_y$ and $S_z$. This can be accomplished manually, through the use of a properly programmed digital computer, or by suitable logic circuitry.

As noted in Tittman, et al, "The Physical Foundations of Formation Density Logging (Gamma Gamma)" Geophysics April, 1965, pp 284–294, and particularly FIG. 1 thereof and the related text, a typical formation matrix will absorb gamma rays only by Compton scattering at energies ranging from about 0.3 Mev up to about 2 Mev. As disclosed by Tittman, et al, it is desirable when carrying out gamma ray density logging to operate within this range so that the intensity of the measured gamma rays is a function solely, or at least primarily, of the electron density and hence of the bulk formation density. In carrying out the present invention, it is similarly preferred, although for somewhat different reasons, to operate within the region where the Compton scattering is the predominant absorption mechanism. In this regard, it is desirable in terms of achieving the greatest accuracy of measurement that the absorption coefficients of the components in the medium under investigation vary from one energy level to another in a substantially monotonic relationship. Preferably the rate of change of the absorption coefficient with a change in energy level will be as close to linear as possible. This can be achieved by operating primarily within the Compton scattering region to the exclusion of significant amounts of photoelectronic absorption and pair production absorption. Preferably at least 90% of the attenuation of the gamma radiation will be due to the Compton scattering mechanism.

Turning now to FIG. 1, there is illustrated one embodiment of the present invention which may be employed in the remote analysis of fluid in a borehole. As shown in FIG. 1, this embodiment of the invention comprises a borehole sonde 2 which is suspended from a cable 4 to a desired depth within a well 5. The well contains a multi component fluid medium 8. For example, the borehole fluid may be composed of three known fluids which may be analogized to the fluids x, y and z referred to previously. The fluid components may be mixed together in any manner. Thus, they may be miscible with one another or in the form of an emulsion and they may comprise both gas and liquid phases.

The sonde 2 includes a gamma ray source 6 and a gamma ray detector 7. The gamma ray source emits gamma rays at three different energy levels. For example, source 6 may contain a mixture of $Ba^{133}$ which emits gamma rays centered about an energy level of 0.36 Mev, cesium-137 which emits gamma rays at a level of 0.67 Mev, and cobalt-60 which emits gamma rays at an energy level of about 1.16 Mev. Detector 7 may be of any suitable type. Thus as shown in FIG. 1, the detector 7 comprises a scintillation type detector 9 coupled to a photomultiplier tube 10. The scintillation unit comprises a crystal of sodium iodide activated with thallium which gives off a photon of light energy which is proportional to the energy of the gamma ray interaction in the sodium iodide crystal. The photomultiplier tube responds to the light energy from the crystals to produce a succession of pulses proportional to the energy of the gamma rays. Both source 6 and detector 7 are collimated by means of collimating channels 11 and 12 respectively, which extend through suitable shields indicated by reference numerals 14 and 15, respectively. Shields 14 and 15 are formed of a suitable material such as tungsten. The collimating channels open into a central chamber 16 interposed between the source and detector which is adapted to receive fluid from the borehole. Fluid communication between chamber 16 and the exterior of the logging tool may be established by any suitable means. For example, the walls of the chamber may have perforations therein as indicated by reference numeral 18 so that the borehole fluid can enter the sonde.

In operation of the system shown in FIG. 1, the output from detector 7 is amplified in the sonde by means of an amplifier 20 and transmitted to the surface by means of a conductor in cable 4. At the surface the signals from the detector are applied to a processing unit 21 where they are energy discriminated and stripped to provide output signals representative of the respective gamma ray energy levels. The operation of unit 21 is described below with reference to FIG. 2. The output signals from unit 2 are then applied to a suitable recorder 22. A depth recording means, such as a measuring sheave 24, produces a depth signal which is also applied to recorder 22, thus correlating the downhole measurements at the depths at which they are taken.

Figure 2:
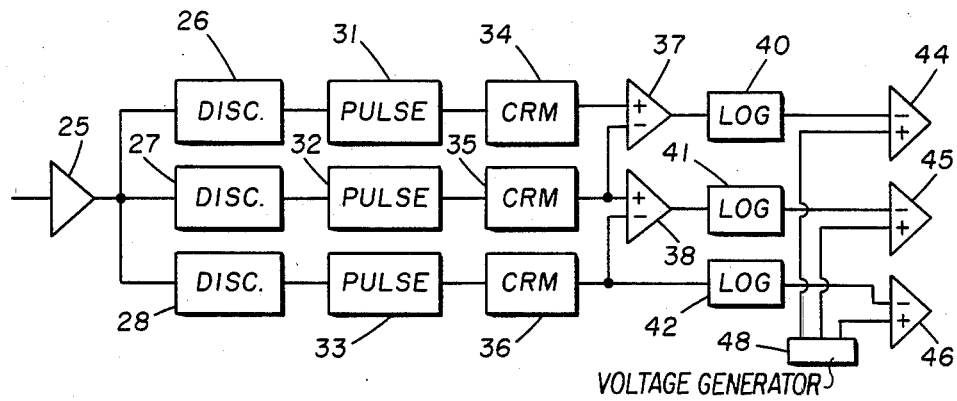
FIG. 2 is a block schematic of the circuitry of the surface processing unit of FIG. 1.

Turning now to FIG. 2, the signals to unit 21 are passed through an amplifier 25 to suitable energy level discriminators 26, 27 and 28. Each of the energy level discriminators is set at a referenced selection energy associated with one of the energy outputs from source 6. For example, discriminator 26 may be set to pass signals representative of gamma ray energies greater than 0.3 Mev and thus filters the signal with respect to "noise" and produces signals representative of gamma rays associated with each of the three gamma ray source isotopes. Discriminator 27 passes signals representative of detected radiation at energy levels of about 0.6 Mev and above and thus is associated with the two higher energy levels. Discriminator 28 passes signals representative of detected gamma radiation at an energy level of 1.1 Mev and above and thus is associated with only the highest discrete energy level.

The outputs from filters 26, 27 and 28 are applied respectively to suitable pulse-shaping units 33, 31 and 32, respectively. For example, each of the pulse shapers may take the form of monostable multivibrators which respond to each output signal from the discriminators to produce a constant amplitude, constant duration voltage pulse. The pulse outputs from the pulse shapers 31, 32 and 33 are applied to count rate meters 34, 35 and 36, respectively, which produce continuous signals representative of the detector count rates. For example, count rate meters 34, 35 and 36 may take the form of RC averaging circuits having relatively long time constant on the order of several seconds. Thus the voltage outputs from the count rate meters will be representative of an average of the outputs from the pulse shapers over several seconds.

The output from count rate meter 36 is supplied to a logarithmic unit 42 and also to the negative input of a subtracting amplifier 38. Unit 42 produces a DC voltage signal of an amplitude which is proportional to the natural logarithm of the amplitude of the applied voltage signal from unit 36. The output from unit 42 is applied to the negative input of a subtracting amplifier 46 where it is subtracted from a first output of a voltage generator 48 which is applied to the positive input of amplifier 46. Voltage generator 48 produces a DC signal which is proportional to the logarithm of the intensity of the high energy beam from gamma ray source 6. This intensity value, corresponding to $I_{o3}$ in equation (9) will normally be known where the gamma ray source takes the form of a mixture of radioactive isotopes as described above. However, it will be recognized by those skilled in the art that the positive input to detector 46 could also take the form of a signal derived from a monitor associated with source 6, which directly measures the intensity of the applied gamma ray beam.

The output from count rate meter 35 is applied to the positive input of subtracting amplifier 38. The output from amplifier 38 is proportional to the difference between the voltage values from count rate meters 35 and 36 and thus is representative of the gamma rays detected by unit 7 corresponding to the attenuated output from the cesium-137 in gamma ray source 6. The output from count rate meter 34 is applied to the positive input of subtracting amplifier 37 which also receives the output from count rate meter 35 at its negative input. Thus the output from amplifier 37 is representative of the relatively low energy gamma rays detected by unit 7. The voltage outputs from amplifiers 37 and 38 are applied to logarithmic units 40 and 41, respectively, which operate similarly as unit 42. The voltage signals from units 40 and 41 are applied to the negative inputs of subtracting amplifiers 44 and 45, respectively. The signal from the voltage generator 48 to the positive input of amplifier 45 is a voltage signal representative of the natural logarithm of incident intensity from the cesium-137, and the signal applied to the positive input of amplifier 44 is representative of the natural logarithm of the intensity of the incident gamma ray beam from the barium-133. The outputs from amplifiers 44, 45 and 46 are applied separately to recorder 22. It will be recognized, of course, that the outputs of units 44, 45, and 46 are representative of the natural log of the ratios of the incident energy to the detected energy corresponding to equations (7), (8) and (9) above and thus may be employed to determine the fractional components of the three components of borehole fluid 8.

Where a unitary source is employed, it may take the form of a single substance which emits radiation from a relatively broad spectrum in which there are a plurality of clearly identifiable peaks. For example, radium may be used as a gamma-ray emitter for a plurality of energy levels. Regardless of the nature of the source, it is desirable to employ at least three discrete energy levels which, as noted above, are in the Compton scattering region. Preferably the extreme energy levels are near the upper and lower limits of the Compton region (but above the photoelectric region and below the pair production region) with one or more additional energy levels located within the intermediate portion of the Compton scattering range. For gamma ray sources of the type described herein, it will be preferred to provide an increment of at least 0.1 Mev between adjoining energy levels. It is also preferred to employ gamma-ray energies above 0.2 Mev and below 2.0 Mev.

In yet a further embodiment of the invention, there is provided a technique which may be employed in conjunction with gamma-gamma density logging to characterize a formation with respect to formation matrix components, the formation fluid components, or the mud cake properties. The invention will be described in respect to the simplest case in which the lithology of the formation matrix is known and in which the formation contains oil, gas and water in unknown saturations.

Where a gamma-ray beam enters a formation under investigation at an angle $\theta_i$ from the vertical and wherein the detector is collimated at an angle $\theta_d$ from the vertical, the photons detected which are subject to a single scattering event will have scattered at an angle $\sigma$ from the incident beam which is equal to $\theta_i + \theta_d$. Where $\theta_i$ and $\theta_d$ are equal, then the scattered photons travel about the same distance as the incident gamma-ray beam before scattering. Discounting borehole effects, the intensity of the gamma ray beam at a scattering point within the formation may be defined by the following relationship:

$$I_p = I_o e^{-\mu_{f1} \rho_b l_p} \tag{10}$$

wherein:
$I_p$ is the intensity of the gamma ray beam at the scattering point in the formation,
$I_o$ is the intensity of the gamma-ray beam at the face of the borehole (the source intensity assuming no absorption within the borehole)
$\mu_{f1}$ is the mass attenuation coefficient of the formation for the initial gamma-ray energy
$\rho_b$ is the bulk density of the formation
$l_p$ is the distance traveled by the incident gamma rays from the source to the scattering point.

Again discounting borehole effects, the intensity of the detected gamma rays may be defined by the following relationship:

$$I_d = I_p e^{-\mu_{f2} \rho_b l_s} \tag{11}$$

wherein:
$I_d$ is the detected gamma ray intensity,
$\mu_{f2}$ is the mass attenuation coefficient of the formation for the scattered gamma-ray energy which is a function of the scattering angle,
$l_s$ is the distance travelled by the scattered gamma rays from the scattering point to the detector, and
$I_p$ and $\rho_b$ are as defined above with respect to equation (10).

By substituting terms from equation 10 into equation 11, equation 12 can be written as follows:

$$I_d = I_o e^{-\rho_b (\mu_{f1} l_p + \mu_{f2} l_s)} \tag{12}$$

In the case where the source and detector are collimated at equal angles ($\theta_i = \theta_d$) equation (12) can be solved for the values, $\mu_{f1}$, $\mu_{f2}$:

$$\mu_{f1} + \mu_{f2} = \frac{1}{\rho_b l} \ln\left(\frac{I_o}{I_d}\right) \tag{13}$$

wherein:
$l = l_p = l_s$

It will be recognized that equations (13) is analogous to the simpler general case represented by equation (2).

The bulk density of the formation $\rho_b$ may be defined by the following equation:

$$\rho_b = (1 - \phi)\rho_m + \phi \rho_f \tag{14}$$

wherein:
$\rho_b$ is the bulk density of the formation
$\rho_m$ is the density of the formation matrix $\rho_f$ is the average density of the fluid saturation, and
$\phi$ is the porosity of the formation.

For a single energy level, the formation attenuation coefficient $\mu_E$ may be defined by the following equation:

$$\mu_E = \mu_m(1-\phi) + \phi(\mu_g S_g + \mu_w S_w + \mu_o S_o) \tag{15}$$

$\mu_m$ is the attenuation coefficient of the formation matrix for the energy level involved
$\mu_g$, $\mu_w$, $\mu_o$ are the attenuation coefficients for gas, water and oil, respectively, for the energy level involved and
$S_g$, $S_w$, $S_o$ are the gas saturation, water saturation, and oil saturation, respectively.

In addition, the following relationships, analogous to equations (5) and (6), respectively, can be presented for the fluid saturation of the formations:

$$\rho_f = \rho_w S_w + \rho_o S_o + \rho_g S_g \tag{16}$$

$$S_w + S_o + S_g = 1 \tag{17}$$

wherein:
$\rho_w$, $\rho_o$, and $\rho_g$ are the water, oil, and gas densities.

In the case in which the matrix lithology, porosity, and scattering angle are known and in which the formation density is known or can be determined by the density logging technique, it will be recognized that for three discrete energy levels of the gamma-ray source, equations analogous to equation 7, 8, and 9 above can be written and solved to determine the values of $S_g$ $S_w$ and $S_o$.

FIG. 3 illustrates a density logging system incorporating yet another embodiment of the present invention. As shown in FIG. 3, the system comprises a logging tool 66 suspended from a cable 67 within a well 68 traversing a subterranean formation of interest indicated by reference numeral 70. The logging tool comprises a gamma ray source 72 and detectors 73 and 74 which are spaced from the detector by unequal distances. Output signals from the detectors 73 and 74 are transmitted uphole via conductors in cable 67 and applied to suitable analysis circuitry 76, described in greater detail hereinafter. The output from unit 76 is provided to a recording system 77 where it is recorded as a function of the depth as indicated by measuring sheave 78. As the logging tool is pulled upwardly through the well in the course of a logging run, it is biased against the side of the borehole by means of a backup arm assembly 80.

In the embodiment illustrated, the gamma-ray source 72 is a unitary source providing a gamma ray output at three discrete energy levels suitable for estimating oil, water and gas saturations where the lithology of the formation 70 is known or can be estimated with suitable accuracy. The gamma-ray source is collimated by means of a collimating channel 72a extending from the source through shielding material 72b. Detectors 73 and 74 are similarly collimated by means of collimating channels 73a and 74a, respectively, extending through shielding material 75. The use of a collimated source and collimated detectors so that both detectors detect gamma rays from the same scattering angle enable the borehole effects to be discounted as described in the aforementioned patent to Kehler. As disclosed by Kehler, the ratio of the gamma-ray intensity detected by the near detector to the gamma-ray intensity measured by the far detector is proportional to the density of the formation. In the embodiment shown in FIG. 3, the collimation channels 77a, 73a and 74a are oriented such that $\theta_i = \theta_d$. Thus, for each of detectors 73 and 74, the scattered gamma rays travel the same distance as the incident gamma rays before scattering at points $P_1$ and $P_2$. While this is preferred it will be understood that other configurations such as disclosed in the patent to Kehler may also be employed.

By way of example it will be assumed that the lithology of the formation is known. The formation contains oil, gas and water and it is desired to obtain the relative concentrations of these fluids. Source 72 provides gamma radiation at three discrete energy levels. Thus the source may, consistent with the previous description, take the form of a mixture of barium-133, cesium-137 and cobalt-60.

Turning now to FIG. 4 there is illustrated one form of analysis circuitry suitable for use in this embodiment of the invention. As shown in FIG. 4, the output from detector 74 is applied via conductor 74c to the surface where it is applied to discriminator-shapers 82a, 82b and 82c, each of which respond to an output signal from the detector above a reference energy level to produce a constant amplitude pulse similarly as in the case of the discriminator-multivibrator coupling shown in FIG. 1. In this case, the threshold energy levels of the units 82a–82c will vary depending upon the loss of energy from scattering, which is a function of the scattering angle. For example, for a scatterng angle $\sigma$ of 115°, unit 82a, corresponding to the 0.36 energy level, may be set at an energy level of 0.16 Mev, unit 82b corresponding to the 0.67 Mev peak at an energy level of 0.21 Mev and unit 2c, corresponding to the higher energy level, at 0.24 Mev. The outputs from discriminator-shapers 82a, 82b and 82c are applied to count rate meters 83a, 83b and 83c which function similarly as the count rate meters shown in FIG. 1. The output from count rate meter 83c is applied to a log-subtract unit 85 and to the negative input of subtracting amplifier 84b. The output from count rate meter 83b is applied to the positive terminal of amplifier 84b and also to the negative input of amplifier 84a where it is subtracted from the voltage signal from count rate meter 83a. The outputs from amplifiers 84a and 84b are applied to the log-subtract unit along with the output from count rate meter 83c. Unit 85 operates similarly as the log unit-subtracting amplifier-voltage generator coupling shown in FIG. 1. Thus the signals from units 85 are representative of the natural logarithm of the ratio of the source intensity to the detector intensity. These signals are applied to a recording unit 86.

The output from detector 73 is applied via conductor 73c through discriminator-shaper units 83a–88c to count rate meters 89a–89c. Since the collimation angle for detector 73 is the same as that for detector 74, discriminators 88a, 88b and 88c are also set at energy levels of 0.16, 0.21 and 0.24, respectively. The outputs from count rate meters 89a through 89c are applied to amplifiers 90a, 90b and log-subtract unit 91 as shown. The output from this unit, which is identical to unit 85, is also applied to recorder 86. Thus the recorded values obtained from each of units 85 and 91 can be employed to determine the oil, gas and water saturations in the formation.

Formation density determinations are made by correlation of the near and far detector count rates at each of the three energy levels. Thus the voltage signals from amplifier 84a and 90a, corresponding to the low energy level gamma rays, are applied to a ratio taking unit 92(a). Similarly the intermediate and high energy-level signals are applied to ratio circuits 92b and 92c, respectively. The output functions from units 92a, 92b, and 92c are applied to recorder 86.

It will be recognized by those skilled in the art that various modifications may be made in the logging system illustrated in FIGS. 3 and 4. For example, while collimation of the source and detectors is preferred, one or more of the source and detectors can be omnidirectional, provided that suitable energy discrimination is employed. However, it will be preferred to collimate at least the detector or detectors. Detector collimation together with energy level discrimination will enable the measurement of photons resulting from a single scattering event. It is also possible to carry out this embodiment of the invention employing a single detector. For example, the formation bulk density, as well as the fluid saturations, can be determined with a single detector where the borehole effects are known or are assumed to make only a minimal contribution to the measurements.

Where two detectors are employed it is preferred, as illustrated in FIG. 4, to energy discriminate both detector outputs for each of the discrete energy levels employed in the source. However, the gas, oil, and water saturations can be determined by energy discrimination of only one detector output. In this case it will be most effective to provide for energy discrimination of the output from the far detector 74 since the borehole effects will influence these measurements to a lesser degree than the measurements made by the near detector. Also, while in the preferred emboiment illustrated, the ratios of detector outputs are obtained for each of the discrete energy levels involved, it will be recognized that formation bulk density can be determined from only one measurement ratio. For example, the voltage values from count rate meters 83a and 89a can be applied directly to a ratio taking circuit for density determination. This is particularly true where both the source and detectors are collimated as illustrated in FIG. 3, since in this case the need for energy level discrimination to limit the detector output to photons of a single scattering event is minimized.

It will be recognized that this embodiment of the invention may be employed to determine parameters other than those indicated above. For example, if the liquid and gas components are known along with the matrix material, the above described tool can be used to determine porosity, liquid saturation and gas saturation. The invention can also be employed to determine the fractions of mixed matrix materials. Characterization of the formation matrix and the fluid saturation of the formation can be accomplished by increasing the number of source energy levels as indicated by the number of matrix components. Of course, the number of discrimination levels of the detector output signals would also be increased corresponding to the source energy levels.

In the invention as thus far described, the radiation sources have taken the form of steady state sources. However, pulsed sources may also be employed, either with or without gating of the detector output. In a further embodiment of the invention the medium under investigation is irradiated with pulses of penetrating radiation of a plurality of discrete energy levels which are applied sequentially.

Figures 5, 6:
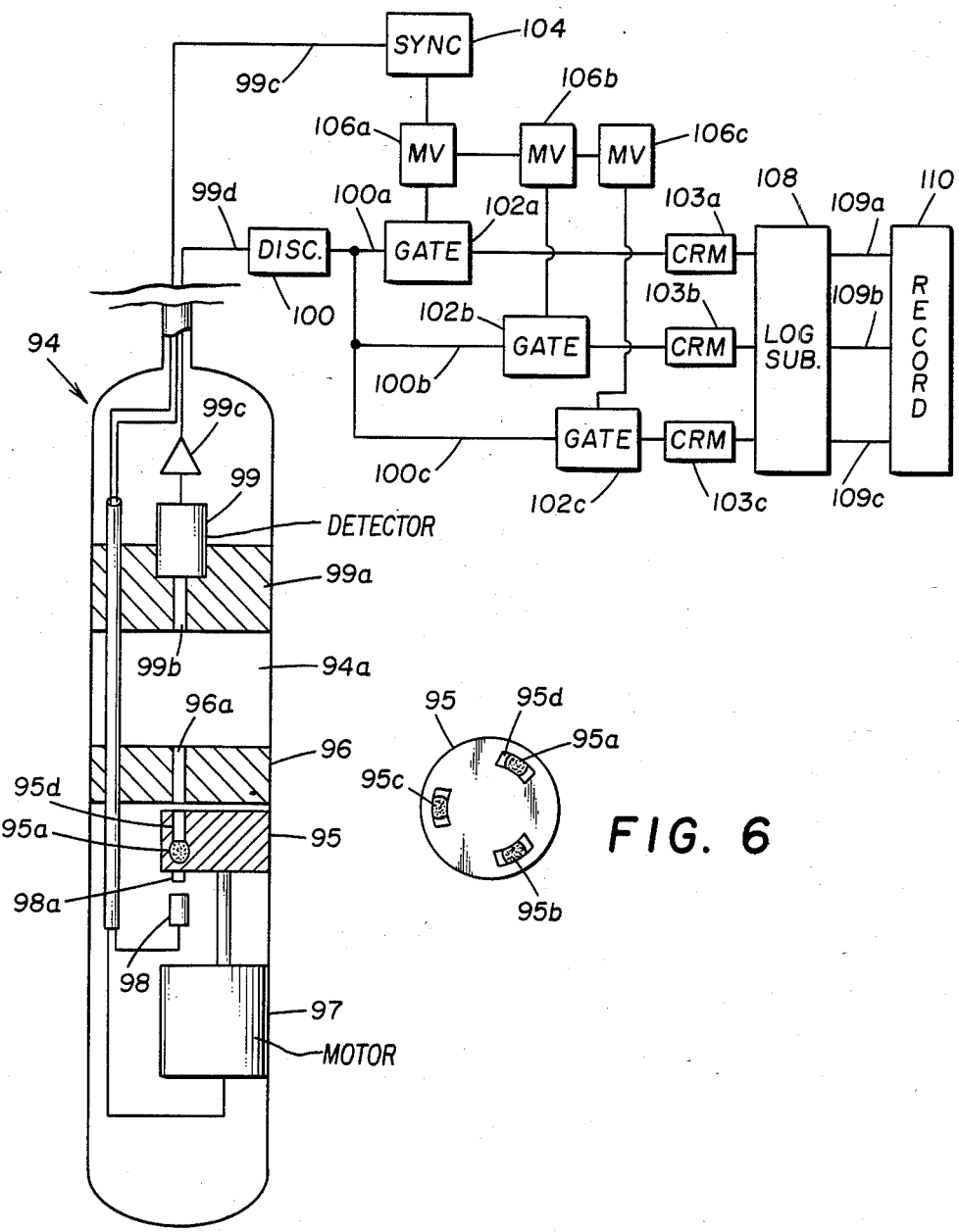
FIG. 5 is a schematic illustration of yet a further embodiment of the invention employing a pulsed source of primary radiation.
FIG. 6 is a plan view of a rotor component of the embodiment shown in FIG. 5.

This embodiment of the invention is illustrated in FIG. 5 which shows a borehole sonde 94 and associated circuitry and in FIG. 6 which shows a plan view of a rotor component of the sonde. The system shown in FIG. 5 is somewhat similar to the well logging system illustrated in FIG. 1. However, it is to be recognized that this embodiment of the invention may be employed in gamma-gamma density logging tools of the type disclosed in FIG. 4 and in other systems for the analysis of multi component media.

More particularly and as shown in FIG. 5 the sonde 94 comprises a source support rotor 95 which is disposed adjacent a shutter 96 and drive by a motor 97. As shown in FIG. 6, source 95 is provided with gamma ray sources 95a, 95b and 95c, each spaced from one another thorugh an arc of 120° and each emitting gamma rays at a different discrete energy level. For example, the sources may take the form of the radioactive isotopes described previously. Thus source 95a, 95b and 95c may be formulated from deposits of barium 133, cecium 137 and cobalt 60, respectively. The rotor 95 and shutter 96 are formed of suitable shielding material such as tungsten and are provided with collimating channels 95d and 96a, respectively. The sonde is also provided with a sync pulse generator 98. For example, the sync pulse generator 98 may take the form of a magnetic pick up device which is activated each time a permanent magnet 98a, which is mounted on the bottom of the rotor passes the pick up. The sonde also includes a detector 99 which is equipped with a shield 99a having a collimating channel 99b therein and a downhole amplifier 99c. The output signals from sync pulse generator 98 and detector 99 are applied to the surface via conductors 99c and 99d respectively.

In operation of the system shown in FIGS. 5 and 6, the rotor 95 is driven by motor 97 in a counterclockwise direction as viewed in FIG. 6. Thus the shutter-rotor interaction produces a pulsed gamma ray source and the medium in the compartment 94a interposed between the source and detector is sequentially irradiated with gamma ray pulses of 0.36 Mev, 0.67 Mev, and 1.16 Mev, respectively.

The output from detector 99 is amplified and applied via conductor 99d to a pulse shaper 100. The pulse shaper 100 discriminates against signal output below a given "noise" level but does not otherwise perform an energy level discrimination function. The constant duration constant amplitude pulses produced by pulse shaper 100 are applied to three channels 100a, 100b and 100c which correspond, respectively, to the discrete energy levels of sources 95a, 95b, and 95c.

Channels 100a, 100b and 100c are under control of gating circuits 102a, 102b and 102c through which the output from the pulse shaper is applied to count rate meters 103a, 103b and 103c. The output from sync pulse generator 98 is applied via conductor 99c to a surface sync unit 104. Unit 104 may take the form of a monostable multivibrator which produces a time delay pulse of a duration equal to or less than the time between the sync pulse from generator 98 and the beginning of the portion of the cycle in which source 95a is exposed to channel 96a. The gating circuits 102a, 102b and 102c are under control of a monostable multivibrators 106a, 106b and 106c, respectively. Thus the output from the multivibrator 104 is applied to multivibrator 106a which produces a positive pulse at the conclusion of the time delay input from unit 104. The pulse from gate control unit 106a actuates the gating circuit 102a, thus allowing the output from pulse shaper 100 to be applied to count rate meter 103a. The output from unit 106a is also applied to multivibrator 106b. Thus at the conclusion of the gate in channel 100a, multivibrator 106b produces a pulse opening gate 102b so that the output from the pulse shaper is applied to count rate meter 103b. The signal from unit 102b also is applied to multivibrator 106c. At the conclusion of the second gating pulse, unit 106c produces a pulse which is applied to gate 102c. During this pulse interval, the detector output is applied to count rate meter 103c. Count rate meters 103a thorugh 103c may take the form of RC averaging circuits as described previously.

The outputs from count rate meters 103a, 103b and 103c are applied directly to a log-subtract unit 108 which functions similarly as the units 85 and 92 as described above with reference to FIG. 4. The outputs from unit 108 are applied via channels 109a, 109b and 109c to a recording unit 110. The signals produced on channels 109a, 109b and 109c correspond to the energy levels of sources 95a, 95b and 95c, respectively. Thus the output on channel 109a, for example, is representative of the natural logarithm of the ratio of the intensity from source 95a to the intensity of the gamma ray radiation detected by detector 99 during the gating interval of unit 102a.

As noted previously, the formation density technique described above with reference to FIGS. 3 and 4 may be carried out employing a pulsed gamma ray source. The pulsed source can be of the type shown in FIG. 5 or can take another suitable form. For example, non-chemical sources which utilize bremsstrahlung effects can be used to provide gamma ray pulses. Where a pulsed source is employed, energy level discrimination, other than that necessary to eliminate "noise", can be dispensed with so long as both the source and the detector or detectors are collimated. With such collimation, the circuitry of the type shown in FIG. 5 can be employed for the detector output. However, if this is not the case, it usually will be desired to employ energy level discrimination for each energy level of the gamma ray source in order to define the detected radiation with respect to its scattering angle.

Having described specific embodiments of the present invention, it will be understood that modifications thereof may be suggested to those skilled in the art, and it is intended to cover all such modifications as fall within the scope of the appended claims.

What is claimed is:

1. In a method of logging a well extending from the earth's surface to a subterranean location to characterize a medium at said location comprising a plurality of components having radiation attenuation coefficients which vary as a function of the energy of applied penetrating radiation, the steps comprising:
   (a) irradiating said medium with gamma radiation having a plurality of discrete energy levels within a range wherein the predominant attenuation mechanism is Compton scattering whereby the absorption of applied radiation within said medium is different at each of said energy levels,
   (b) detecting gamma radiation emanating from said medium for each of said discrete energy levels, and
   (c) selectively measuring the intensity of the detected radiation for each of said discrete energy levels and correlating the intensities of said detected radiation with the intensities of applied radiation at each of said discrete energy levels.

2. The method of claim 1 wherein said medium comprises at least three components and is irradiated with radiation of at least three discrete energy levels.

3. The method of claim 1, wherein said energy levels are above 0.2 Mev and below 2.0 Mev.

4. The method of claim 1 wherein at least 90% of the attenuation of gamma radiation at said energy levels is by Compton scattering.

5. The method of claim 1 wherein said medium is irradiated with gamma rays having at least three energy levels falling within a range wherein the predominant attenuation mechanism is Compton scattering.

6. The method of claim 5 wherein said energy levels are separated from one another by an increment of at least 0.1 Mev.

7. The method of claim 1 wherein said discrete energy levels of radiation are applied sequentially in repetitive pulses to said medium.

8. The method of claim 1 wherein said discrete energy levels of radiation are applied simultaneously to said medium.

9. In a well logging system for determining the fractions of components of a multicomponent medium at a subterranean location, the combination comprising:
   (a) an elongated logging tool adapted for insertion into a borehole,
   (b) source means in said tool for irradiating a medium under investigation with gamma radiation at a plurality of discrete energy levels above 0.2 Mev and below 2.0 Mev,
   (c) detector means in said tool spaced from said source means for detecting gamma radiation emanating from the medium under investigation for each of said energy levels and producing output signals in response to said detected radiation, and
   (d) means responsive to said output signals for selectively measuring the intensity of the detected radiation for each of said discrete energy levels and correlating the intensities of said detected radiation with the intensities of radiation from said source at each of said discrete energy levels.

10. The system of claim 9 further comprising a chamber in said logging tool interposed between said source means and said detector means and in fluid communication with the exterior of said logging tool whereby said chamber is adapted to receive the medium under analysis.

11. The system of claim 10 wherein said measuring means includes means for energy discriminating said output signals at values corresponding to each of said discrete energy levels.

12. The system of claim 9 wherein said source means comprises a pulsed source for emitting sequential pulses of gamma radiation of successively different energy levels.

13. The system of claim 12 wherein said measuring means comprises a plurality of measuring channels corresponding to said discrete energy levels, gate means for each of said channels for applying, during actuation thereof, the output signals from said detector means to said channels, and control means synchronized with said source means for sequentially actuating said gate means.

14. In the method of logging a well extending from the earth's surface and, traversing a subterranean formation, the steps comprising:
   (a) irradiating said formation with gamma rays having a plurality of discrete energy levels above 0.2 Mev whereby the absorption of gamma ray photons within said formation is different at each energy level
   (b) detecting gamma rays scattered from said formation for each of said discrete energy levels, and
   (c) selectively measuring the intensity of the detected gamma radiation for each of said discrete energy levels in correlation with depth and with the intensity of applied radiation at each of said energy levels.

15. The method of claim 14 wherein said formation is irradiated with gamma rays having at least three discrete energy levels.

16. The method of claim 14 wherein said formation is irradiated with gamma rays at a plurality of discrete energy levels falling within the range at which the predominant attenuation of gamma radiation is by Compton scattering.

17. The method of claim 14 wherein said formation is sequentially irradiated with repetitive pulses of said discrete energy levels of gamma radiation.

18. The method of claim 17 wherein said formation is irradiated with a collimated beam of incident gamma rays and the gamma rays scattered from said formation are detected in a collimated beam.

19. The method of claim 18 wherein the collimation angles from the vertical of said incident gamma ray beam and said scattered gamma ray beam are equal.

20. In a well logging system, the combination comprising:
   (a) an elongated loggng tool adapted for insertion into a well bore,
   (b) gamma ray source means in said tool for emitting gamma rays at a plurality of discrete energy levels above 0.2 Mev,
   (c) detector means in said tool for detecting gamma rays and producing output signals representative of the energy levels of detected gamma rays, and
   (d) means responsive to said output signals for selectively measuring the intensity of detected gamma rays associated with each of said discrete energy levels.

21. The system of claim 20 wherein said gamma ray source means comprises a unitary gamma ray source capable of emitting gamma rays at at least three discrete energy levels.

22. The system of claim 21 wherein said detector means comprises a unitary gamma ray detector in said logging tool and said intensity measuring means comprising means for energy discriminating the output signals from said unitary detector for at least three gamma ray energies corresponding to said discrete energy levels.

23. The system of claim 20 wherein said detector means is collimated along an axis extending outwardly from said tool.

24. The system of claim 23 wherein said source means is collimated along an axis extending outwardly from said tool and intersecting the collimation axis of said detector.

25. The system of claim 24 wherein said source means comprises a pulsed source for emitting sequential pulses of gamma rays at different energy levels.

26. In a well logging system, the combination comprising:
   (a) an elongated logging tool adapted for insertion into a borehole, (b) gamma ray source means in said tool for emitting gamma rays at a plurality of discrete energy levels,
(c) first detector means in said loggiing tool for detecting gamma rays and producing output signals representative of the energy levels of said detected gamma rays,
(d) second detector means in said tool for detecting gamma rays and producing output signals representative of the energy levels of said detected gamma rays, said second detector means spaced from said source means by a distance greater than the spacing between said source means and said first detector means,
(e) means responsive to the output signals from at least one of said detector means for selectively measurng the intensity of detected gamma rays associated with each of said detector energy levels, and
(f) means for correlating at least one parameter of the output signals from said first detector means with at least one parameter of the output signals from said second detector means.

* * * * *

UNITED STATES PATENT AND TRADEMARK OFFICE
CERTIFICATE OF CORRECTION

PATENT NO. : 4,558,220

DATED : December 10, 1985

INVENTOR(S) : Hilton B. Evans

It is certified that error appears in the above-identified patent and that said Letters Patent is hereby corrected as shown below:

Column 12, line 34, change "emboiment" to --embodiment--.

Column 18, line 5, change "measurng" to --measuring--.

Column 18, line 6, change "detector" to --discrete--.

Signed and Sealed this

Twenty-first Day of October, 1986

[SEAL]

*Attest:*

DONALD J. QUIGG

*Attesting Officer*     *Commissioner of Patents and Trademarks*